United States Patent

Budrys

[15] 3,653,018

[45] Mar. 28, 1972

[54] MONITOR CIRCUIT

[72] Inventor: Ignas Budrys, Fairport, N.Y.

[73] Assignee: Stromberg-Carlson Corporation, Rochester, N.Y.

[22] Filed: June 8, 1970

[21] Appl. No.: 44,182

[52] U.S. Cl. ..........................340/248 P, 307/231, 307/233, 307/234, 307/235, 307/64

[51] Int. Cl. ......................................................G08b 21/00

[58] Field of Search .............179/175.2 A, 175.2 B; 340/248, 340/271, 409, 248 P, 261, 258 B, 248 D, 253 P, 235 Q, 235 Y, 267, 307.1, 309.4, 167, 167 A, 169; 324/188; 328/120, 129; 307/293, 231, 64

[56] References Cited

UNITED STATES PATENTS

| | | | |
|---|---|---|---|
| 2,082,104 | 6/1937 | Gibson et al. | ..................179/175.2 B |
| 3,299,404 | 1/1967 | Yamarone et al. | ..................340/167 X |
| 3,281,810 | 10/1966 | Thornberg et al. | .............340/309.1 X |
| 3,370,285 | 2/1968 | Cruse et al. | ........................340/258 B |
| 3,452,160 | 6/1969 | McFarland | ......................179/175.2 A |

*Primary Examiner*—John W. Caldwell
*Assistant Examiner*—Daniel Myer
*Attorney*—Charles C. Krawczyk

[57] ABSTRACT

The circuit of the invention monitors the amplitude, duration, and repetition rate of telephone ringing bursts. When the ringing bursts are of proper magnitude and form, a bistable circuit is maintained in a reset condition. Should the amplitude, and/or repetition rate, and/or duration, of the ringing bursts fall below specified limits, a signal developed by an integrator circuit is insufficient to prevent a pulse generator from switching the flip-flop circuit into an alarm condition.

8 Claims, 1 Drawing Figure

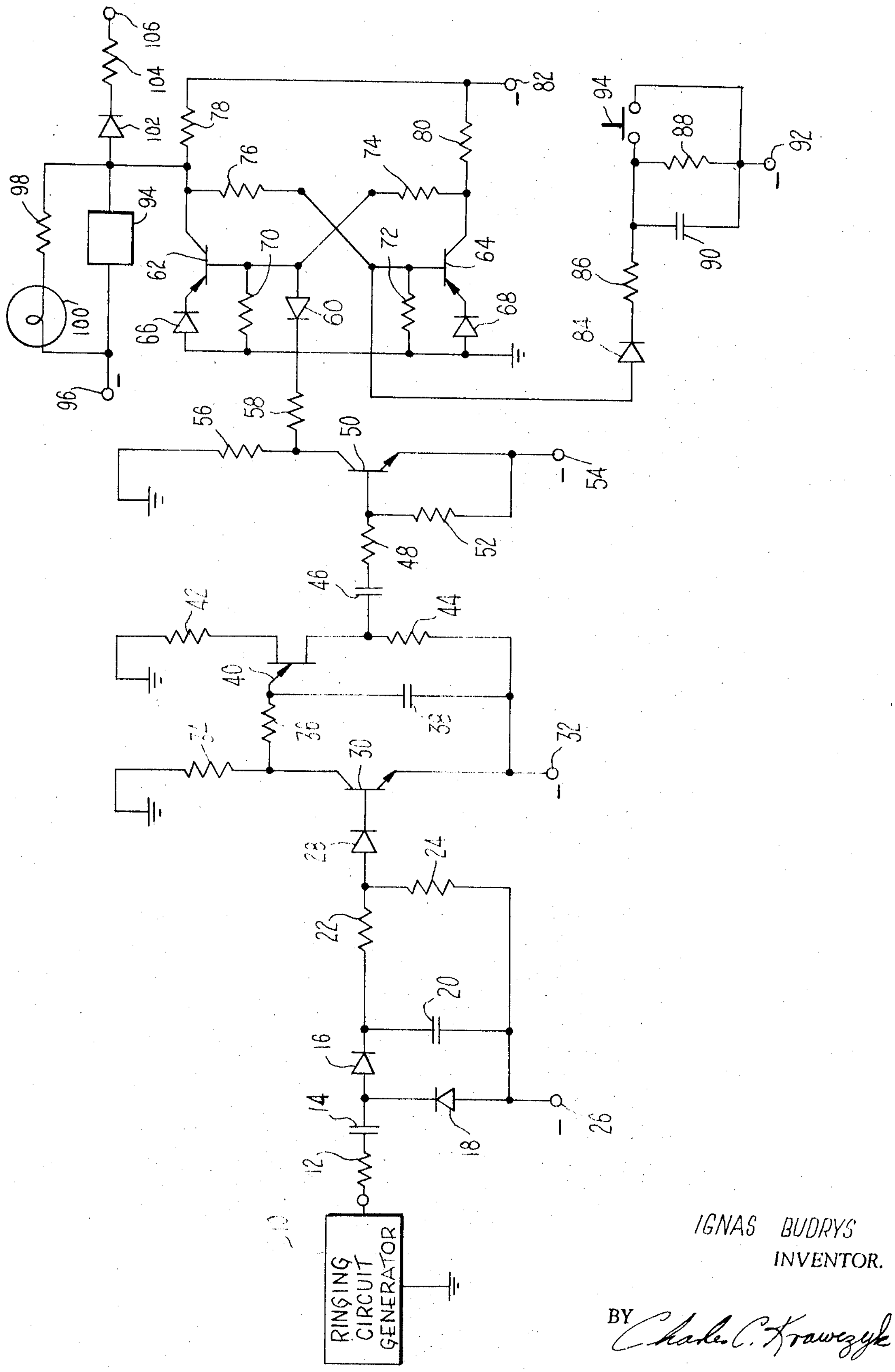
IGNAS BUDRYS
INVENTOR.
BY Charles C. Krawczyk
ATTORNEY

MONITOR CIRCUIT

BACKGROUND OF THE INVENTION

This invention pertains to alarm circuits in general, and more particularly to alarm circuits for monitoring the operation of ringing generator circuits in telephone systems.

When a telephone subscriber is to be signalled of the presence of an incoming call, the telephone exchange connects a ringing generator circuit to the subscriber's line. The ringing generator circuit supplies an alternating current (AC) signal superimposed on a direct current (DC) supply voltage to activate the ringer in the subscriber's telephone. The DC voltage provides a ring-trip signal for indicating an off hook condition when the subscriber answers the call. In order to assure that the subscriber's ringer is properly activated each time a ringing generator is connected to the subscriber's line, the operation of the ringing generator circuit is generally continuously monitored. If the ringing generator circuit fails, the generator circuit is disconnected and replaced by another.

The ringing generator circuit generally produces a continuous alternating current (AC) that is periodically interrupted so as to produce AC ringing bursts of AC signals at a desired repetition rate which are separated by a silent period. For example, the ringing generator circuit may produce 20 hertz ringing bursts having a peak-to-peak amplitude of 200 volts, and a duration of 1 second, with 3 seconds spacing therebetween.

In the monitor circuits of the prior art, generally only the amplitude of the ringing bursts was monitored. However, this type of arrangement is insufficient to assure that the ringer in the subscriber's telephone is adequately energized. For example, the ringing bursts should be of sufficient duration to produce a distinctive ringing signal. If the ringing bursts are too short, the ringer may not receive sufficient energy and may click rather than audibly ring. Furthermore, the repetition rate should not be too low, wherein a person can step into a room and then step out again between ringing bursts. Hence, it is desirable that a monitor arrangement for ringing generator circuits should include sufficient means for monitoring the various characteristics of ringing bursts to insure that the called subscriber is adequately signalled and thereby assure that the call will be completed.

It is therefore an object of this invention to provide a new and improved monitor circuit for telephone ringing signals.

It is also an object of this invention to provide a new and improved monitor circuit for telephone ringing generator circuits for observing the operation of the generator circuit to assure proper subscriber signalling.

It is still a further object of this invention to provide a new and improved monitor circuit for observing the operation of telephone ringing generator circuits, that monitor the amplitude and duration of ringing bursts, and the repetition rate thereof.

BRIEF DESCRIPTION OF THE INVENTION

The invention includes a circuit for monitoring the burst amplitude, burst duration and burst repetition rate of telephone ringing signals to determine if these parameters fall within acceptable limits. Circuit means receives the ringing signals and produces signal pulses, the duration of which is a function of the amplitude and duration of the ringing bursts, and which have a repetition rate corresponding to the repetition rate of the ringing bursts. A time delay circuit is coupled to receive the signal pulses for producing an alarm signal if the duration and/or repetition rate of the signal pulses is sufficiently low to allow the time delay period to expire.

BRIEF DESCRIPTION OF THE FIGURE

The FIGURE includes an electrical schematic diagram of the monitor circuit of the invention.

DESCRIPTION OF THE PREFERRED EMBODIMENT

The FIGURE includes a ringing generator circuit 10 of the type that continuously produces AC ringing bursts having a desirable amplitude, time duration, and repetition rate, with acceptable low limits of operation. The ringing generator can, for example, be designed to produce 200 volt peak-to-peak 20 hertz ringing bursts having a 1 second duration and 3 seconds of spacing therebetween, and can, for example, have limits of acceptable operation of at least 120 volts peak-to-peak amplitude, at least one-half second of duration, and at least a repetition rate of 5 seconds. The ringing generator circuit 10 is adapted to be connected by telephone exchanges to telephone lines of subscribers to signal the subscribers of the presence of incoming calls. The amplitude, duration, and repetition rate of the ringing bursts and limits of acceptable operation vary from system to system, according to particular system design specifications. This type of ringing generator circuit is well known in the art. The ringing generator circuit 10 is connected to the monitor circuit of the invention, so that the ringing burst amplitude, duration, and repetition rate, can be continuously monitored to assure that the ringing generator circuit is properly operating and thereby assures that the subscriber will be properly signalled of the presence of an incoming call.

The ringing generator circuit 10 is connected through a current limiter resistor 12 to a combined voltage divider and integrator circuit. The resistor 12 is connected through a capacitor 14 to the junction of a pair of diodes 16 and 18. The diodes 16 and 18 are connected across a capacitor 20. A pair of resistors 22 and 24 are connected across the capacitor 20 to function as a voltage divider. The common connection between the one end of the diode 18, one end of the capacitor 20, and one end of the resistor 24, is connected to a negative power supply terminal 26. A control signal is developed across the capacitor 20 that varies in magnitude as a function of the ringing burst amplitude and duration. The capacitor 20 is charged during the presence of the ringing burst, and discharges between bursts. Hence, the duration of the control signal is therefore a function of the ringing burst amplitude and duration, and has a repetition rate equal to the repetition rate of the ringing bursts.

The junction of the resistors 22 and 24 is connected through a diode 28 to the base of a control transistor 30. The emitter of the transistor 30 is connected to a negative power supply terminal 32 while the collector is connected through a resistor 34 to ground. A series circuit, including a resistor 36 and a capacitor 38, is connected across the emitter and collector of the transistor 30. The transistor 30 is rendered conductive by the presence of the control signals and functions to discharge the capacitor 38. The resistors 34 and 36 and the capacitor 38 form a charging circuit for triggering a unijunction transistor 40. The junction of the capacitor 38 and the resistor 36 is connected to the emitter of the unijunction transistor 40. The source and drain of the transistor 40 are connected between the power supply terminal 32 and ground, via the resistors 42 and 44.

The values of the resistors 12, 22 and 24, the capacitors 14 and 20, and the magnitude of the power supply voltage at the terminal 26, are selected so that if the bursts from the ringing circuit generator 10 have: (1) an amplitude greater than a preset minimum acceptable level, and (2) a duration greater than a preset minimum time, the capacitor 20 is sufficiently charged during the presence of each ringing burst to render the transistor 30 conductive to discharge the capacitor 38 for a sufficient period of time to prevent the capacitor from being recharged to the transistor 40 trigger level between ringing bursts having an acceptable repetition rate. For example, if the minimum amplitude is set at 120 volts peak-to-peak, and the burst duration is set to be greater than one-half second, the voltage divider and integrator circuit can have the following values:

resistor 12 = 39 k ohms
resistor 22 = 24 k ohms resistor 24 = 75 k ohms
capacitor 20 = 6.8 microfarads
capacitor 14 = 2 microfarads
voltage at terminal 26 = −48 volts The repetition rate of the ringing bursts is monitored by the charge time of the capacitor 38. The rate at which the capacitor 38 charges is controlled by the resistors 34 and 36. The magnitude of potential to which the capacitor 38 charges is inversly controlled by the time duration the transistor 30 is conductive and the rate of its conduction. The resistive-capacitive (RC) time constant for charging the capacitor 38 is selected so that the capacitor 38 cannot be sufficiently charged between bursts to trigger the unijunction transistor 30 unless: (1) the repetition rate of the bursts is too low, and/or (2) the magnitude of the control voltage is too low (due to reduced bursts amplitude and/or reduced burst duration). When the control signal is low, the capacitor 38 is charged to the trigger point even though the burst repetition rate is within limits. The values of the components in the charging circuit for the unijunction transistor 40 (resistors 36 and 34 and capacitor 38) are selected to correspond to the minimum desirable repetition rate of the ringing bursts. For example, if the minimum repetition rate is to be 5 seconds, the charging circuit will have the following values:

resistor 34 = 240 k ohms
resistor 36 = 10 k ohms
capacitor 28 = 20 microfarads
voltage at terminal 26 = −10 volts The drain of the transistor 40 is connected through a coupling capacitor 46 and a resistor 48 to the base of a switching transistor 50. The base of the transistor 50 is also connected through a biasing resistor 52 to a negative power supply terminal 54. The collector and emitter of the transistor 50 are connected between the negative terminal 54 and ground, via a resistor 56. The transistor 50 is biased into a cut-off condition until it receives a pulse from the unijunction transistor 40.

The collector of the transistor 50 is connected through a resistor 58 and a diode 60 to the base of a transistor 62 of a bistable flip-flop circuit including the transistors 62 and 64. The emitters of the transistors 62 and 64 are connected to ground through the diodes 66 and 68, respectively, while the bases of the transistors are also connected to ground through the resistors 70 and 72, respectively. The base electrodes of the transistors 62 and 64 are also connected through the resistors 74 and 76, respectively, to the collectors of the other flip-flop transistors. The collectors of the transistor 62 and 64 are also connected through the resistors 78 and 80, respectively, to a negative power supply terminal 82. The base of the transistor 64 is connected through a series circuit including a diode 84, a resistor 86 and the parallel combination of resistor 88 and capacitor 90, to a negative power supply terminal 92. The arrangement is such that when the circuit is initially energized, a current pulse through the series circuit (including resistors 88 and 86, capacitor 90, and diode 84) renders the transistor 64 conductive to reset the flip-flop circuit (non-alarm condition), and assures that the transistor 62 is cut off. A push button 94 is connected across the resistor 88 to provide a manual means for resetting the flip-flop circuit.

A relay 94 is connected between a negative power supply terminal 96 and the collector of the transistor 62 so that when the flip-flop is set (the transistor 62 is conductive), the relay 94 is energized to provide the necessary switching for disconnecting the inoperative ringing generator circuit and connecting another circuit in its place. A series circuit including a resistor 98 and a light 100 is connected across the relay 94 to provide a visual alarm signal. The collector of the transistor 62 is also connected through a diode 102 and a current limiting resistor 104 to a terminal 106 for connection to other alarm type circuits.

In operation, as long as the ringing generator circuit 10 provides an acceptable range of ringing burst amplitudes and durations, the control signal (applied to the base of transistor 30) is of sufficient magnitude and duration so that the transistor 30 discharges the capacitor 38 for a period of time of sufficient duration so that the unijunction 40 cannot be triggered between ringing bursts having an acceptable repetition rate. Therefore, the flip-flop circuit remains in its reset non-alarm state. In the event the amplitude of the ringing burst falls below the prescribed minimum limit, and/or the burst duration is less than the minimum time limit, the capacitor 38 will not be discharged for a sufficient period of time to prevent triggering the transistor 40 between ringing bursts having an acceptable repetition rate. Furthermore, if the repetition rate of the bursts falls below prescribed limits, the transistor 30 will be cut off for a sufficient period of time to allow the capacitor 38 to be charged to an amplitude to trigger the transistor 40 (and therefore the alarm flip-flop), even though the amplitude and burst duration are within acceptable limits.

As can be seen by the above description of the invention, the monitor circuit of the invention provides a means for continuously checking the amplitude, duration and repetition rate of telephone ringing bursts. Any failure in any one of these parameters, or any failure in any combination of these parameters, below prescribed limits, results in an alarm signal. Hence, it can be seen that the monitor circuit of the invention provides a means for checking the operating parameters of a telephone ringing generator circuit to assure that the ringing generator circuit, when connected to a subscriber's line, will adequately and distinctly ring the subscriber's telephone.

What is claimed is:

1. A circuit for monitoring the operation of a telephone ringing generator circuit that generates ringing signals having periodic ringing bursts, said monitor circuit comprising:
   a bistable circuit having a normal state and an alarm state;
   circuit means for receiving the ringing signals and developing signal pulses the duration of which is a function of the amplitude and duration of said ringing bursts, and having a repetition rate corresponding to the repetition rate of said ringing bursts, and
   a time delay circuit developed between said bistable circuit and said circuit means for switching said bistable circuit into said alarm state if the period between said signal pulses is longer than the time delay period of said time delay circuit.

2. A monitor circuit as defined in claim 1 wherein:
   said time delay circuit comprises a unijunction transistor including a charging circuit for triggering said unijunction circuit, and
   wherein the time duration for charging said charging circuit to trigger said unijunction transistor in absence of a signal pulse defines a minimum acceptable repetition rate for said ringing burst.

3. A monitor circuit as defined in claim 1 wherein:
   said bistable circuit comprises a flip-flop circuit, and includes circuit means for switching said flip-flop circuit into said normal state when the monitor circuit is initially energized.

4. A monitor circuit as defined in claim 1 wherein:
   said circuit means comprises an integrator circuit coupled to receive said ringing signals and to produce said signal pulses wherein the magnitude and duration of said signal pulses are a function of the amplitude and duration of said ringing burst, and
   wherein said time delay circuit comprises a charging circuit coupled to an amplitude sensitive trigger circuit to trigger said trigger circuit when said charge reaches a preset amplitude, and a switching circuit coupled between said integrator circuit and said charging circuit to inhibit said charging circuit from charging to the trigger level during the presence of said signal pulses above a preset magnitude.

5. A monitor circuit as defined in claim 1 wherein:
   said circuit means includes an integrator circuit coupled to receive the ringing signals to charge capacitive means during the presence of ringing bursts with a potential that is a function of the ringing burst amplitude and duration and discharges the capacitive means in absence of ringing bursts, a biasing circuit for providing a biasing potential, and a switching circuit for producing said signal pulses, the duration of which, is a function of the charge on the capacitor and the magnitude of the biasing potential, and said time delay circuit comprises a charging circuit coupled to an amplitude sensitive trigger circuit to trigger said trigger circuit when said charge reaches a preset amplitude, and circuit means coupling said charging circuit to said switching circuit so that the presence of said signal pulses inhibits said charging circuit from accumulating a charge.

6. A monitor circuit as defined in claim 5 wherein the time for said charging circuit to reach the trigger amplitude, in absence of signal pulses, is a function of the minimum acceptable repetition rate of said ringing bursts.

7. A circuit for monitoring the operation of a telephone ringing generator circuit to produce an alarm signal when at least one of the amplitude, duration, and repetition rate of the ringing bursts which comprise the ringing signal falls below a minimum acceptable value, said monitor circuit comprising:

a charging circuit;

an alarm circuit coupled to said charging circuit for producing continuous alarm signals when the potential stored by said charging circuit reaches a preset magnitude, and circuit means for receiving said ringing signals coupled to said charging circuit to allow said charging circuit to charge to a potential sufficient to switch said alarm circuit when at least one of the amplitude, duration, and repetition rate of said ringing bursts falls below a preset value.

8. A circuit for monitoring the operation of a telephone ringing generator circuit that generates ringing signals having periodic ringing bursts comprising:

an integrator circuit for developing control signals, the amplitude and duration of which are a function of the amplitude and duration of said ringing bursts and which have a repetition rate corresponding to the repetition rate of said ringing bursts;

a charging circuit;

a trigger circuit coupled to said charging circuit for producing an output signal when said charging circuit charges to a preset potential;

circuit means coupling said integrator circuit to said charging circuit to discharge said charging circuit and inhibit said charging circuit from charging to said preset amplitude between ringing bursts while the amplitude, duration, and repetition rate of the ringing bursts are above preset values, and a bistable switching circuit coupled to said trigger circuit so that when said trigger circuit is switched, said bistable circuit is switched to an alarm state.

* * * * *